April 12, 1932. R. LANG 1,853,734
ELECTRIC TRANSMITTER FOR TRANSMITTING VALUES OF ANGLES
Filed Jan. 31, 1930 4 Sheets-Sheet 1

Inventor:-
Rudolf Lang
by
Attys.

April 12, 1932. R. LANG 1,853,734
ELECTRIC TRANSMITTER FOR TRANSMITTING VALUES OF ANGLES
Filed Jan. 31, 1930 4 Sheets-Sheet 2

Inventor:-
Rudolf Lang
by
Lawyer, Parry, Card Sharpin
Attys.

Patented Apr. 12, 1932

1,853,734

UNITED STATES PATENT OFFICE

RUDOLF LANG, OF VIENNA, AUSTRIA, ASSIGNOR TO AKTIENGESELLSCHAFT C. P. GOERZ OPTISCHE ANSTALT ACTIOVA SPOLECNOST K. P. GOERZ OPTICKY USTAV, OF BRATISLAVA, CZECHOSLOVAKIA

ELECTRIC TRANSMITTER FOR TRANSMITTING VALUES OF ANGLES

Application filed January 31, 1930, Serial No. 425,051, and in Germany February 11, 1929.

For transmitting positions of pointers on circular scales electric apparatus are used, as is well known, the transmitter of which is provided with contacts arranged in circles on an insulating plate. In such apparatus it is preferred to subdivide the values of the angles to be transmitted into units, tens, hundreds and if necessary also thousands groups, each of such groups being associated to a correspondingly subdivided contact group. The said contacts are connected by a cable with suitably arranged current indicating devices for instance small numbered incandescent lamps in the receiving station. Only those of these devices indicate the flowing therethrough of a current the numbering of which is the same as the numbering of these contacts of the transmitting station which are brought into contact with the movable contact springs or brushes rigidly connected to the transmitting pointer.

In case that the angle values to be transmitted differ from each other only by very small increments the divisions of the contacts of the transmitter will have to be made very small if the insulating plate carrying the contacts must not become unduly large. This results in certain difficulties as regards the connection with the cable leading to the receiver, so that in the usual arrange of the units contacts, in which the successive contacts on the periphery of the transmitter contact plate correspond to successive angle values such contacts cannot be reduced below a certain size owing to the space required for the said connections with the cable.

The object of my invention is to make the size of the transmitter very small even in case that the angle values to be transmitted are very small. With this object in view my invention consists in making the angular distance between centres of the units contacts arranged in a circle, or the angle occupied by such a units contact equal to the theoretical units angle, that is to say equal to 360° divided by the number of angle units contained in 360° plus once or more times the angular distance of the contact springs sliding or moving along the units circle.

Figure 1:
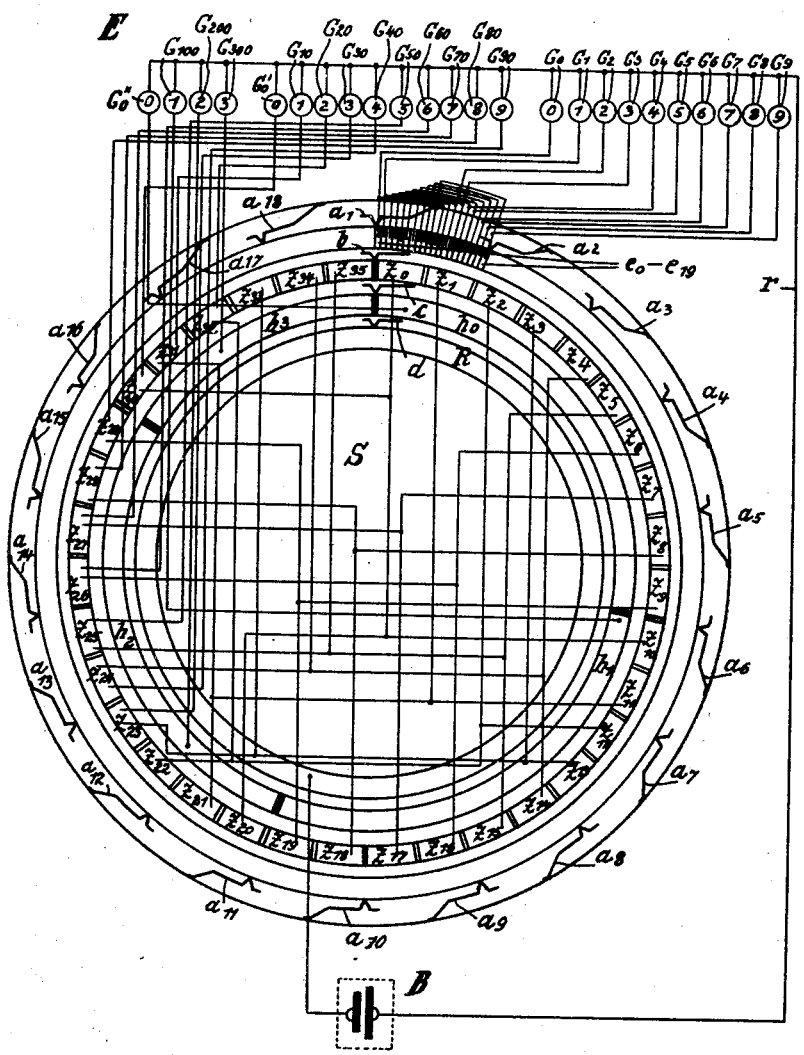
Figure 2:
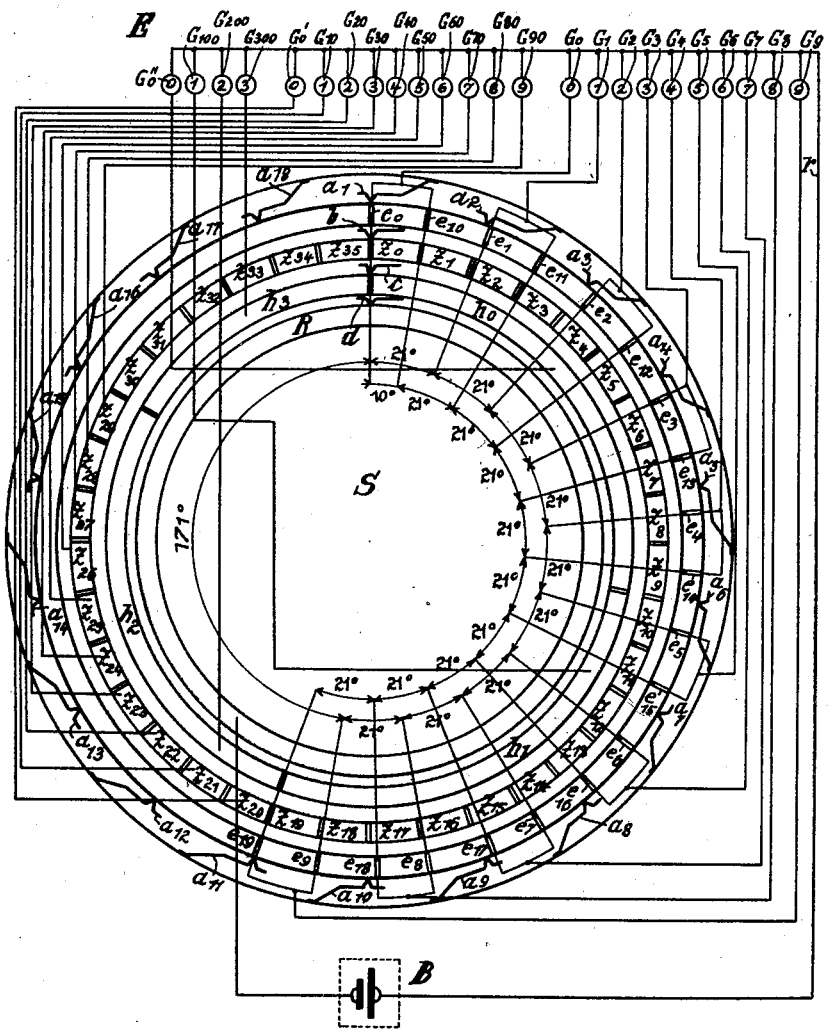
Figure 3:
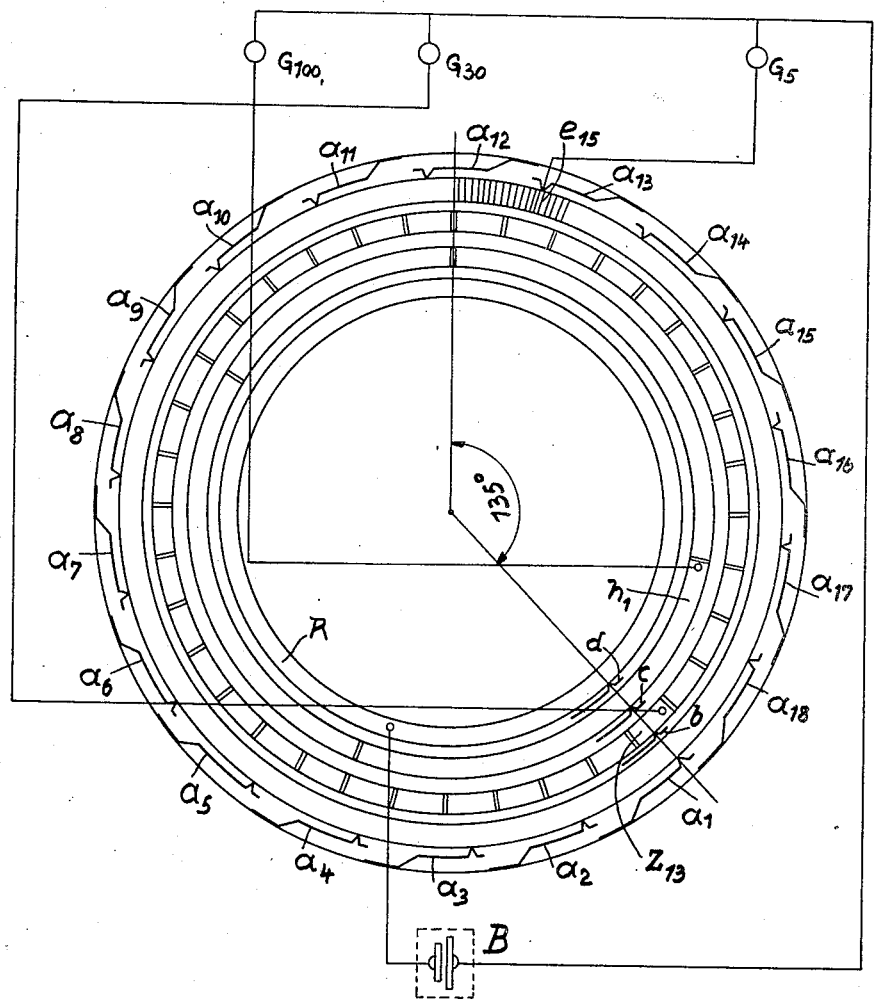
Figure 4:
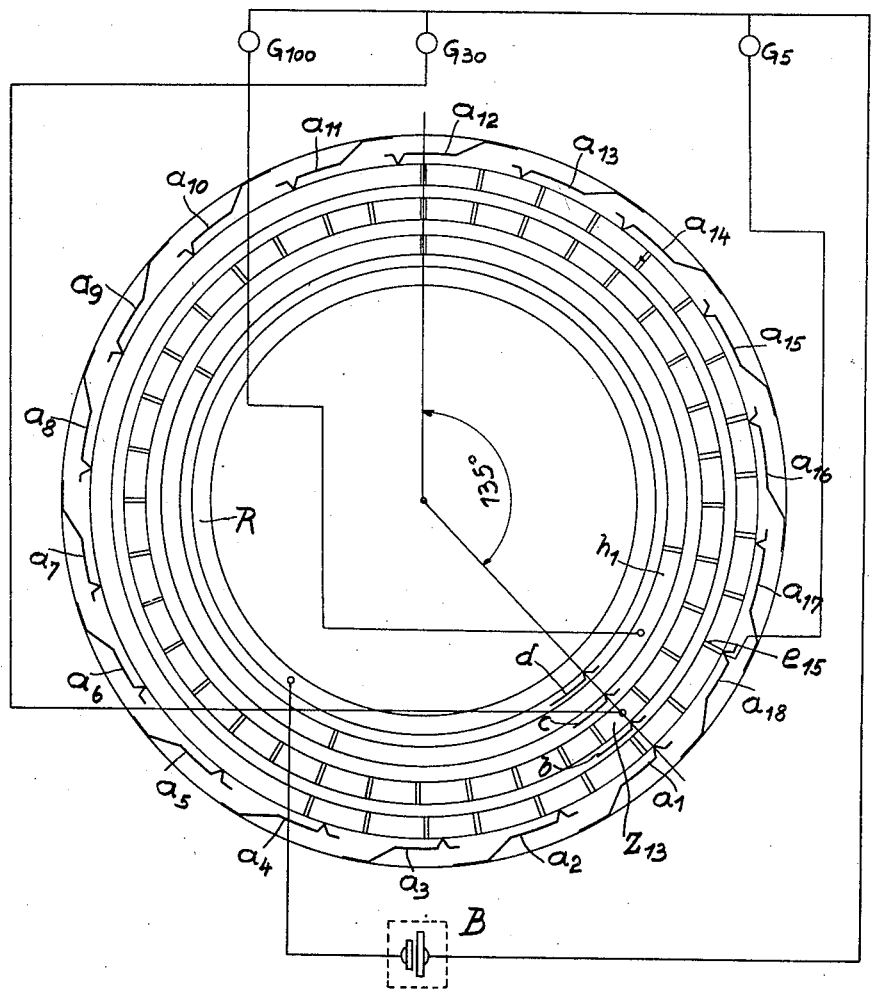

For facilitating the understanding of the present invention I have shown diagrammatically in Fig. 1 a transmitter of the class referred to of known construction. Fig. 2 shows diagrammatically by way of example an embodiment of my present invention. Fig. 3 illustrates the operation of the device shown in Fig. 1, and Fig. 4 illustrates the operation of the device shown in Fig. 2.

In the known transmitter, as shown in Fig. 1, an insulating disc S carries the entire angular division and on it are arranged 20 unit contacts $e_0$ to $e_{19}$ at angular distances of 1° the one from the adjacent one. These contacts are uniformly distributed over a central angle which theoretically is 19° and practically is slightly greater on account of the width of the insulating gaps, but in any case does not exceed 20°. These contacts are electrically connected in pairs, $e_0$ being connected with $e_{10}$, $e_1$ with $e_{11}$, $e_2$ with $e_{12}$ and so on, up to $e_9$ which is connected with $e_{19}$. From each of the ten contacts $e_0$ to $e_9$ a wire leads to a numbered incandescent lamp $G_0$ to $G_9$ of the receiver E. Over these 20 unit contacts slide 360:20=18 contact springs $a_1$ to $a_{18}$ all of which are electrically connected with each other having their contact points set exactly 360°:18=20° apart. These contact points are of such a width that they bridge the insulating gap between two adjacent contact strips, whereby sparking due to the breaking of current is avoided. Inside and concentrically to the circle of unit contacts $e$ are arranged 36 tens contact $Z_0$ to $Z_{35}$ each occupying a central angle of about 9° the width of the insulating gap between two adjacent tens contacts being about 1°. Of these tens contacts are electrically connected with each other $Z_0$ with $Z_{10}$, $Z_{20}$ with $Z_{30}$, then $Z_1$ with $Z_{11}$, $Z_{21}$, $Z_{31}$ and so on up to $Z_9$ with $Z_{19}$ and $Z_{29}$. From each of the tens contacts $Z_0$ to $Z_9$ a wire leads to one of the ten numbered incandescent lamps $G'_0$, $G_{10}$, $G_{20}$ up to $G_{90}$. A contact spring $b$ having a contact point wide enough to bridge the insulation gaps slides over all the 36 tens contacts in succession. Inside and concentric to the circle of tens contacts Z are arranged the hundreds contact segments $h_0$, $h_1$, $h_2$, $h_3$, four in number, each of the segments $h_0$, $h_1$, $h_2$ occupying a central angle of 99°, while the segment $h_3$ occupies 59°, the insulation gaps between these hundreds segments being 1° in width. Over these hundreds segments slides a contact spring $c$ the contact point of which is wide enough to bridge the insulation gaps. From each of these hundreds contact segments leads a wire to one of the numbered incandescent lamps $G_0$, $G_{100}$, $G_{200}$, $G_{300}$. One of the terminals of each of the 24 incandescent lamps of the transmitter is connected to the wire $r$ leading to one terminal of the battery B. The other terminal of the latter is connected to a contact ring R inside and concentric to the ring formed of the hundreds segments $h_0$ to $h_3$. On this ring R slides the contact spring $d$. All of the 20 contact springs are secured to the pointer plate of the transmitter. Therefore in any position of the transmitter one lamp of the hundreds set, one lamp of the tens set and one of the units set will be lighted. Only if any of the contact springs is bridging one of the insulating gaps two lamps of the corresponding set will be lighted.

From Fig. 1 it will be seen that in this case the smallest possible circumference of the plate carrying the contacts must be 360 times as great as the smallest possible unit contact. Now in order to enable me to reduce the size of the transmitter without varying the number of contacts and contact springs the units contacts for successive angle values which in Fig. 1 are located side by side, are arranged according to my present invention, as shown in Fig. 2 that is to say the angle occupied by each units contact is equal to the angle between adjacent units contact points plus the theoretical angle of the units contact which in the example given is 1° and hence is represented by 360° : 18 = 20°, 20° + 1° = 21°. But as the total angle occupied by all the units contacts must not exceed 360° and as a uniform division of these 20 units contacts would give an angle of 19 × 21 = 399° these contact strips have to be divided into two groups the angle occupied by each contact being 21° but the two groups being staggered relatively to each other by 10°. Therefore the units contacts are divided as follows: In the first group $e_0$ to $e_9$ with an angular distance of 21° between two contact strips then between $e_9$ and $e_{10}$ an angular distance of $$360 + 10 - (21 \times 9) = 181 = 9 \times 20 + 1$$

and for $e_{10}$ up to $e_{19}$ again an angular distance of 21°. Consequently there is no uniform angular distance between adjacent contact strips but an angular distance varying between 10° and 21° − 10° = 11°. The uniform division of the contact strips is found with a transmitting step of 1° when only 10 units contacts at an angular distance of 21° are used and 360 : 10 = 36 contact springs at angular distances of 10°. Now as the size of the transmitter mainly depends on the angular distance of the units contacts and may be the smaller the greater this angular distance is, this latter arrangement with 10 units contacts and 36 contact springs would be still more advantageous than that shown in Fig. 2 having 20 units contacts and 18 contact springs. The arrangement of the tens and hundreds contacts as also the electric connections with the numbered incandescent lamps are the same as those shown in Fig. 1.

Assuming that the electric transmitter shown in Fig. 1 is adjusted to any angle, say 135°, no matter whether this angle is known to the operator or whether the transmitter is adjusted to this angle automatically and unknown to the operator, say by adjusting a telescope or the like to a given point starting from a given zero position, then as shown in Fig. 3, starting from a given initial position, the hundreds brush $c$ will contact the hundreds segment $h$, and the tens brush $b$ will contact the tens contact plate $z_{13}$ while one of the units brushes $a_{13}$ will contact the units contact $e_{15}$ whereby the incandescent lamps $G_{100}$, $G_{30}$ and $G_5$ are lighted, thereby indicating at the receiver station the angle of 135° to which the transmitter has been adjusted.

If now the transmitter constructed in accordance with my invention and shown in Fig. 2 is adjusted as above set forth to the same angle of 135° starting from its initial position then, as shown in Fig. 4, the hundreds brush $c$ will again contact the hundreds segment $h$, the tens brush $b$ will contact the tens segment $z_{13}$, and the units brush $a_{18}$ will contact the units contact $c_{15}$, whereby, the same as in the case of the transmitter shown in Fig. 1, the incandescent lamps $G_{100}$, $G_{30}$ and $G_5$ will be lighted, thus, of course, again indicating at the receiving station the angle of 135°. But while in the transmitter shown in Figs. 1 and 3 the units contacts are thronged in a small fraction of the circumference of a circle, thereby necessitating a large radius of the circle for accommodating the required number of units contacts and their insulations, and determining the minimum width; in my improved transmitter shown in Figs. 2 and 4 the necessary number of units contacts is distributed over the entire circumference of a circle, so that the radius of the circle may be made much smaller without unduly reducing the width of the individual units contact segments. Moreover the insulation between successive units contacts need not be cared for since these insulations are more than sufficiently wide. Thus it will be seen that by my present invention the construction of the transmitter is greatly facilitated and at the same time its accuracy and reliability is greatly increased.

What I claim is:

Electric transmitter for transmitting values of angles differing by small increments the said values being represented by units, tens, hundreds and so on groups, comprising a separate contact group associated to each of the first named groups, such contact groups being arranged in concentric rings, equidistant contact springs sliding on the units contact ring, the angle between the centers of two successive contacts being equal to the theoretical units division angle plus at least one time the angular distance between adjacent units contact springs.

In testimony whereof I affixed my signature.

RUDOLF LANG.